ят
2,899,362
HEMOSTATIC SPONGES AND METHOD OF PREPARING SAME

George Madison Sieger, Jr., Pearl River, William Valentine, Nanuet, and Joseph Francis Weidenheimer, Pearl River, N.Y., assignors to American Cyanamid Company, New York, N.Y., a corporation of Maine No Drawing. Application June 12, 1957
Serial No. 665,136

10 Claims. (Cl. 167—84)

This invention relates to absorbable hemostatic surgical sponges, to methods of preparing the same, and to products made up of or containing the new sponge material.

Absorbable hemostatic sponges made essentially of gelatin have been available and widely used by surgeons for some time. Such sponges are effective largely because gelatin tends to react with the blood plasma to stimulate the release of clotting components. Hemostatic sponges made of frozen starch paste which are also used in surgery mechanically draw the blood into fine capillaries of the sponge and thus promote clotting. While these sponges are non-antigenic, are generally absorbed by the body and have found acceptance among many surgeons, they nevertheless have some poor physical properties which make their use unsatisfactory at times. One of the objects of the present invention is to produce an absorbable hemostatic sponge which has all of the advantages of the hemostatic sponges now available to the surgeon yet possess superior physical properties which make its use easier and more effective.

The new hemostatic sponges of the present invention are made from a solution of gelatin and cooked starch paste in certain proportions, which proportions result in sponges having superior strength, resiliency, color, dimensional stability, and absorbability. The new sponges of the present invention also have other advantages which will be apparent from the following description.

The preferred sponges of the present invention are made up with the essential components gelatin and starch in the ratio of approximately 40 percent gelatin and 60 percent starch. When the proportion of gelatin is made lower, down to about 20 percent gelatin, the resulting sponge tends to become hard and brittle, as are starch sponges. It is below strength and loses the excellent resiliency of the preferred sponges made in accordance with the present invention.

One of the disadvantages of sponges made from frozen starch is the difficulty of incorporating antibiotics and other antiseptics or medicinal agents uniformly throughout the matrix of the sponge. When making surgical sponges in accordance with the present invention, antibiotics and other medicinal agents can be readily incorporated in an absolutely uniform manner throughout all portions of the sponge matrix without layering or migration of the agent to particular areas thereof. Therefore, when the proportion of gelatin becomes lower than 20 percent and the proportion of starch increases to about 80 percent by weight, the disadvantages of the starch sponges become evident in the new products; and accordingly, amounts of starch larger than about 80 percent should not be used.

We have also found that when the proportion of starch approaches 80 percent, the viscosity of the solution becomes too high, and it is difficult to form a satisfactory foam by whipping. It is also extremely difficult to dry the product satisfactorily.

On the other hand, when the proportion of gelatin increases to the neighborhood of 60 percent by weight the product shows a definite loss of its elastic sponge-like character as compared with the preferred embodiment of the present invention. The resulting sponge has poor resiliency, dimensional stability, soaks up less fluid and has a poor wet strength.

The new sponges of the present invention are made by whipping air into a blend of gelatin and cooked starch to increase the volume thereof from two to seven times, and thereafter drying the resulting foam to obtain a resilient sponge-like mass which may be cut into any desired shape. After sterilization, the sponge is ready for use.

The gelatin should be of a pharmaceutically acceptable grade, free of antigenic components and other impurities. A number of suitable gelatin products made from hides and bones are available on the market and may be used in preparing the new sponges. We prefer bone gelatin on account of its slightly alkaline pH which makes it more compatible with body tissue in most instances wherein the sponge would be used. The gelatin should be of from 200 to 250 bloom.

The starch component of the sponge should also be a high-grade material free from impurities which might adversely affect its use in surgery. Fortunately, highly pure grades of corn starch are readily available and this is the preferred material for practicing the invention. Starches made from rice and other cereals, as well as starches from roots, such as tapioca, may also be used.

The starch is cooked in water prior to formation of the sponge foam in order to rupture the starch cells. The concentration of the solution should be from about 5 to 15 percent by weight in order to obtain a satisfactory blend when mixed with the gelatin solution for whipping into a stable foam. Larger amounts tend to make the blend too thick and too difficult to whip into a satisfactory foam; and such a foam is difficult to dry satisfactorily.

Similarly, the gelatin should be dissolved in water with heating to obtain a solution of from about 5 to 15 percent by weight of gelatin. The solution should not be too dilute in order that the final mix may be of correct consistency yet should be thin enough so that it can be filtered to remove insoluble solids often found in the commercial product. The starch paste and the filtered gelatin solution may then be combined and cooled to a suitable working temperature and whipped into a foam of two to seven times the volume of the blend by any conventional beating or mixing device which tends to incorporate air into the liquid. A large variety of such mixing devices ranging from simple egg beaters to large dough mixers are available and no particular import is given to the type of mixer that is used or the time required to incorporate the necessary volume of air into the mass.

In a preferred embodiment of the sponges, small amounts of formaldehyde are added to harden the gelatin. This formaldehyde treatment tends to give the sponge a higher wet strength but also tends to decrease the rate of absorption of the sponge by the body fluids. Amounts of formalin ranging up to about 0.060 percent by weight of the gelatin component of the sponge incorporated into the liquid mass prior to whipping yield satisfactory sponges.

The whipped starch-gelatin mixture is preferably dried slowly at room temperatures in a dry atmosphere. Elevated temperatures tend to cause the foam to collapse and the application of vacuum to the drying operation usually results in a foam of unsatisfactory appearance.

A large number of different kinds and varieties of medicinal agents may be incorporated in the foam, preferably before the liquid gelatin-starch mixture is whipped into a foam. Antibiotics, particularly tetracycline, chlortetracycline, and oxytetracycline, are especially valuable in these foams in amounts up to about 2 percent by weight. Other antibiotics such as chloramphenicol, streptomycin, neomycin, bacitracin, polymyxin and others may also be incorporated into the sponge by this procedure. Similarly, any of the sulfa drugs may be incorporated in foam in this manner. Of course, antiseptics such as hexachloraphene, proteolytic enzymes such as pepsin, blood clotting substances such as thrombin, colors and odors may also be incorporated in the sponge in suitable amounts by merely mixing with the liquid composition prior to the whipping operation. Contrary to experiences encountered in making the sponges of starch, the medicinal agent remains uniformly dispersed throughout the entire body of the sponge in its final form. Usually only small amounts of these materials need be used for maximum effectiveness.

The invention will be now described in greater particularity by a few specific embodiments thereof which are contained in the following examples. Although these represent the best mode of practicing the invention as presently contemplated, it will be apparent to those skilled in the art that considerable variation may be made therein in the proportions of starch and gelatin which may range from about 20 percent gelatin and 80 percent starch to 60 percent gelatin and 40 percent starch while still obtaining the advantages of the invention.

EXAMPLE I

Eight hundred milliliters of distilled water were heated to 80° C. and 79.8 grams of pork skin gelatin (225 bloom) were added slowly with agitation until entirely dissolved. The solution was then filtered. One hundred twenty grams of corn starch U.S.P. were slurried with 1200 milliliters of cool distilled water and the slurry then heated to 85° C. with constant agitation. The starch paste and the filtered gelatin solution were then mixed, agitated and cooled to 35° C. 1.9 milliliters of formaldehyde N.F. were then added with agitation and the solution held between 35 and 40° C. for one half hour. The solution was then transferred to a Hobart Model A–120 blender and air was whipped into the mixture utilizing No. 3 speed and a wire basket type beater until a five-fold increase in bulk volume was achieved. The foam was then transferred to pans and dried at room temperature at 3 percent relative humidity. The dried sponge was then cut into desired shapes with a band saw, placed in glassine bags, sealed and heat sterilized at 110° C. for ten hours. The material was then ready for use in surgery.

EXAMPLE II

Heat 800 milliliters of distilled water to 75–80° C. and add 79.12 grams of pork gelatin (200 bloom) slowly with agitation. Stir until the solution is complete and then filter through a filter press to clarify. Slurry 118.68 grams of corn starch in 1200 milliliters of cool distilled water in a steam-jacketed vessel and heat with agitation at 80–85° C. The gelatin and starch solutions are then mixed together. Remove 1500 milliliters of the mixed, cooled (35–40° C.) blends and add 2.08 grams of tetracycline neutral. Add the tetracycline-containing suspension to the remaining portion of the gelatin-starch mix and agitate the entire blend for ten minutes, and then pass the suspension through a Premier colloid mill at 0.002-inch opening. Transfer the milled suspension to a Hobart-type blender and whip it at high speed until the bulk volume increases five times. Remove the foam and place in pans and condition for approximately 36 hours at room temperature at 3 percent relative humidity until the sponge is dry. Cut the dry sponge into desired sizes with a band saw. Transfer the cut sponges to a vacuum oven and temperature of 70–75° C. for one hour. Remove the sponges, package in glassine bags and heat sterilize at 110° C. for ten to twenty hours. The sterilized surgical sponge is then ready for use.

EXAMPLE III

The sponge dust resulting from the cutting operation is collected, placed in glass vials having perforated shaker tops and heat sterilized at 110° C. for ten hours. This dusting powder may be used as such in surgical operations.

EXAMPLE IV

Eight hundred milliliters of distilled water are heated to 75–80° C. and 0.016 gram of methyl parahydroxy benzoate and 0.004 gram of propyl parahydroxy benzoate are heated and dissolved with agitation. 79.12 grams of pork gelatin (225 bloom) are then added slowly with agitation until completely dissolved. The solution is then filtered through cloth on a filter press. 118.68 grams of corn starch U.S.P. are slurried in 1200 milliliters of cool distilled water and then heated on a steam bath to 80–85° C. with constant agitation. Starch paste and the filtered gelatin solution are then mixed with agitation and cooled to 35–40° C. 1.9 grams of formaldehyde N.F. are then added with agitation and the solution held at 35–40° C. for one half hour. One hundred fifty milliliters of the treated blend were removed from the main body of the solution and 2.08 grams of tetracycline neutral mixed therewith and the antibiotic suspension then returned to the main body of the starch-gelatin blend. The entire blend is then agitated for ten minutes and passed through an Eppenbach bench type colloid mill at 0.02-inch opening. The treated material is then transferred to a Hobart Model A–120 type blender and air is whipped into the starch-gelatin blend utilizing No. 3 speed and a wire basket type beater until a five-fold increase in bulk volume has been achieved. The foam is then transferred to wire screens and dried at 3 percent relative humidity at room temperature. The sponge is then cut into desired shapes, packaged, dried further at 70° C. and then heat sterilized at 110° C. for ten hours.

EXAMPLE V

Starch-gelatin hemostatic sponges were prepared in the identical manner described above with the exception that bone gelatin was used in place of the pork gelatin. Satisfactory hemostatic sponges were obtained.

EXAMPLE VI

A series of gelatin-starch sponges were made in accordance with the procedure of Example I using approximately 40 percent pork skin gelatin (225 bloom) and 60 percent U.S.P. corn starch. To different batches of these sponges were added varying amounts of formaldehyde as follows: 0.0192 percent, 0.0384 percent, 0.056 percent, which was added prior to whipping in air. In all cases, superior hemostatic surgical sponges were obtained. It appeared, however, that as the amount of formaldehyde was increased, the wet strength of the sponge increased and it could be handled more roughly in preoperative manipulations than those sponges in which none or only small amounts of formaldehyde were added. On the other hand, the sponges treated with larger amounts of formaldehyde require a longer period of time to disintegrate in body fluids.

EXAMPLE VII

Sponges made by the process of Example I were prepared and compared with commercially available hemostatic sponges made essentially of gelatin. In one such comparison, pieces of the all-gelatin sponge of commerce and the starch-gelatin sponge of the present invention were dropped into a beaker of water and allowed to become thoroughly saturated. They were then removed and weighed with the following results:

Table I

PHYSICAL PROPERTIES OF STARCH-GELATIN SPONGES AS COMPARED WITH GELATIN SPONGES

|  | Density, gm./cm.³ | Absorption in gms. H₂O | |
|---|---|---|---|
|  |  | Pieces of equal weight (200 mg.), gm. | Pieces of equal size (8.4 cm.³), gm. |
| Starch-gelatin | 0.024 | 6.0 | 12.3 |
| Gelatin | 0.007 | 6.6 | 1.7 |

As will be seen from the above data, the starch-gelatin sponge of the present invention has approximately the same absorptive capacity on a weight basis as the commercially available all gelatin sponge but is far superior in absorbability on a volume basis.

Similar comparisons with the all-starch sponges of commerce could not be obtained because the starch sponge disintegrated too easily.

EXAMPLE VIII

To illustrate the superior dimensional stability of the sponges of the present invention, a starch-gelatin sponge prepared by the process of Example I and cut to a size 20 mm. x 60 mm. x 7 mm. was compared with an all-gelatin hemostatic sponge of the same dimensions as sold on the open market. These sponges were immersed in water and gently kneaded with the fingers for 30 seconds, as is recommended prior to their use. After a period of another 30 seconds, during which time the sponges were allowed to recover their original shape, they were again measured. The results of these tests are shown in the following table.

Table II

|  | Size before wetting with H₂O, 23° C. | After saturation by water (wetting and kneading for 30 seconds followed by 30-second period for recovery) |
|---|---|---|
|  | Millimeters | Millimeters |
| Starch-gelatin | 20 x 60 x 7 | 20 x 60 x 7 |
| All gelatin | 20 x 60 x 7 | 15 x 50 x 1.5 |

As will be seen, the sponges of the present invention have such excellent resiliency and sponge-like properties that it returned to its original dimensions even after repeated compression and distortion by the kneading process. On the other hand, the all-gelatin sponges did not return to their full original size and, hence, lack the essential characteristics of a true sponge.

Again, as in the preceding example, starch sponges which were tried in this test disintegrated and no measurements could be obtained.

EXAMPLE IX

In still another comparative test, the starch-gelatin sponges of the present invention prepared by the process of Example I and having the dimensions 20 mm. x 60 mm. x 7 mm. were compared as to wet tensile strength with an all gelatin sponge purchased on the open market. In these tests, both sponges were kneaded for 30 seconds in water at room temperature after which the sponges were tied at one end with a string which led to a securely fastened rod and were tied at the other end by another string arranged to hold weights. The sponges were tied so that the longest dimension was stretched vertically as weights were added to the lower strings. It was found in the case of the all-gelatin sponge that it would support only 25 grams before rupture. On the other hand, the starch-gelatin sponge prepared by the process of Example I supported 120 grams before rupturing.

These tests clearly indicate the greater wet strength of the sponges of the present invention when compared with the strongest surgical hemostatic sponges previously available to the surgeon.

EXAMPLE X

The effectiveness of the antibiotic in the sponges prepared by the process of Example II was determined by preparing small discs of 0.5 cm. in diameter and 0.1 cm. in thickness of the sponge material containing tetracycline. These sponges were implanted in agar seeded with the test organisms *Bacillus cereus* and *Staphylococcus aureus*. Upon incubation of the test plates, it was found that the tetracycline effectively inhibited the growth of the microorganisms as shown by zones of inhibition extending out a substantial distance from the test disc.

EXAMPLE XI

The solubility of the sponge material and the ability of it to disintegrate in body fluids was also determined in comparison with an all-gelatin sponge which was purchased. In short, there was no discernible difference between the two types of sponges. The starch-gelatin sponge prepared in accordance with the process of Example I remained intact on soaking in distilled water at room temperature for seven days as did the all-gelatin sponge of commerce. In artificial gastric juice and artificial intestinal fluids, both types of sponges dissolved at the same rate at 37° C.

Because of the superior physical properties, strength, resiliency, and absorbability of the sponges of the present invention, their use is not necessarily restricted to hemostatic purposes in surgery. Inasmuch as they are composed of innocuous materials, and can be readily sterilized, they are of value in the operating room for mopping-up purposes where ordinary cellulosic sponges and cotton towels might be objectionable.

A particularly valuable aspect of the present invention is the use of the sponge material in making bandages, several types of which have been developed. One novel product of considerable value is made by substituting the conventional gauze pad on adhesive bandages with a small piece of starch-gelatin sponge. This small square or disc of sponge material acts as a hemostatic agent when applied to a small cut or abrasion and is held in place by the adhesive tape. The sponge stops the flow of blood and serum and as the wound heals, the sponge tends to disintegrate; and when the bandage is to be removed, it may be done without disturbing the scab that has formed over the damaged tissue. Such bandages are of particular value when the sponge contains an antibiotic such as tetracycline.

Another type of bandage material which is of particular value as a compress is made by soaking cotton gauze in the starch-gelatin blend as it is constituted before whipping air into it. The saturated gauze is then removed from the blend and squeezed to remove excess starch-gelatin blend and is air dried. This material has hemostatic properties and is less apt to adhere to the body tissue with which it is placed in contact than in the case of ordinary surgical gauze bandages or compresses. Various other medical and surgical articles made of the new sponges of the present invention will suggest themselves to those skilled in the art and such products are intended to be included within the scope of the present invention.

What is claimed is:

1. A method of making a hemostatic surgical product which comprises the steps of preparing an aqueous solution containing from 5 to 15 percent by weight of total solids comprising a mixture of cooked starch and gelatin in approximately the ratio of 40 to 80 percent by weight of starch and 20 to 60 percent by weight of gelatin and incorporating air into said solution to form a foam having a volume of from about two to seven times that of the solution, and thereafter drying said foam.

2. A process in accordance with claim 1 in which the components of the sponge are treated with up to about 0.06 percent by weight of formaldehyde.

3. A method of preparing hemostatic surgical sponges which comprises the steps of preparing an aqueous solution containing from about 5 to 15 percent by weight of total solids which comprise cooked starch and gelatin, the ratio of starch to gelatin being approximately 40 to 80 percent by weight of starch and 20 to 60 percent by weight of gelatin, whipping air into said solution to form a foam of a volume of about two to seven times the original volume of the starch-gelatin solution and thereafter drying said foam to obtain a hemostatic surgical sponge.

4. A hemostatic surgical sponge comprising 40 to 80 percent by weight of cooked starch and 20 to 60 percent by weight of gelatin.

5. A hemostatic surgical sponge according to claim 4 in which the volume of the pores is from two to seven times that of the remaining solid material.

6. A hemostatic surgical sponge comprising a dry mixture of 40 to 80 percent by weight of cooked starch and 20 to 60 percent by weight of gelatin and a small amount of an antibiotic.

7. A hemostatic surgical sponge according to claim 6 in which the volume of the pores is from two to seven times that of the remaining solid material.

8. An adhesive bandage for external use comprising an adhesive tape and a centrally located hemostatic sponge comprising from 40 to 80% by weight of cooked starch and 20 to 60% by weight of gelatin.

9. An adhesive bandage according to claim 8 in which the hemostatic sponge contains a small amount of an antibiotic.

10. A sponge according to claim 4 in which the sponge is finely comminuted in the form of a powder.

References Cited in the file of this patent
UNITED STATES PATENTS

| | | |
|---|---|---|
| 1,304,600 | Pond | May 27, 1919 |
| 2,423,475 | Bice | July 8, 1947 |
| 2,465,357 | Correll | Mar. 29, 1949 |
| 2,597,011 | MacMasters | May 20, 1952 |
| 2,751,324 | English | June 19, 1956 |